Dec. 15, 1936.  H. C. COLE  2,064,055
WINDSHIELD HEATER
Filed Feb. 5, 1936  2 Sheets-Sheet 1

Inventor
Harry C. Cole
by Roberts Cushman & Woodberry
attys.

Dec. 15, 1936.  H. C. COLE  2,064,055
WINDSHIELD HEATER
Filed Feb. 5, 1936  2 Sheets-Sheet 2
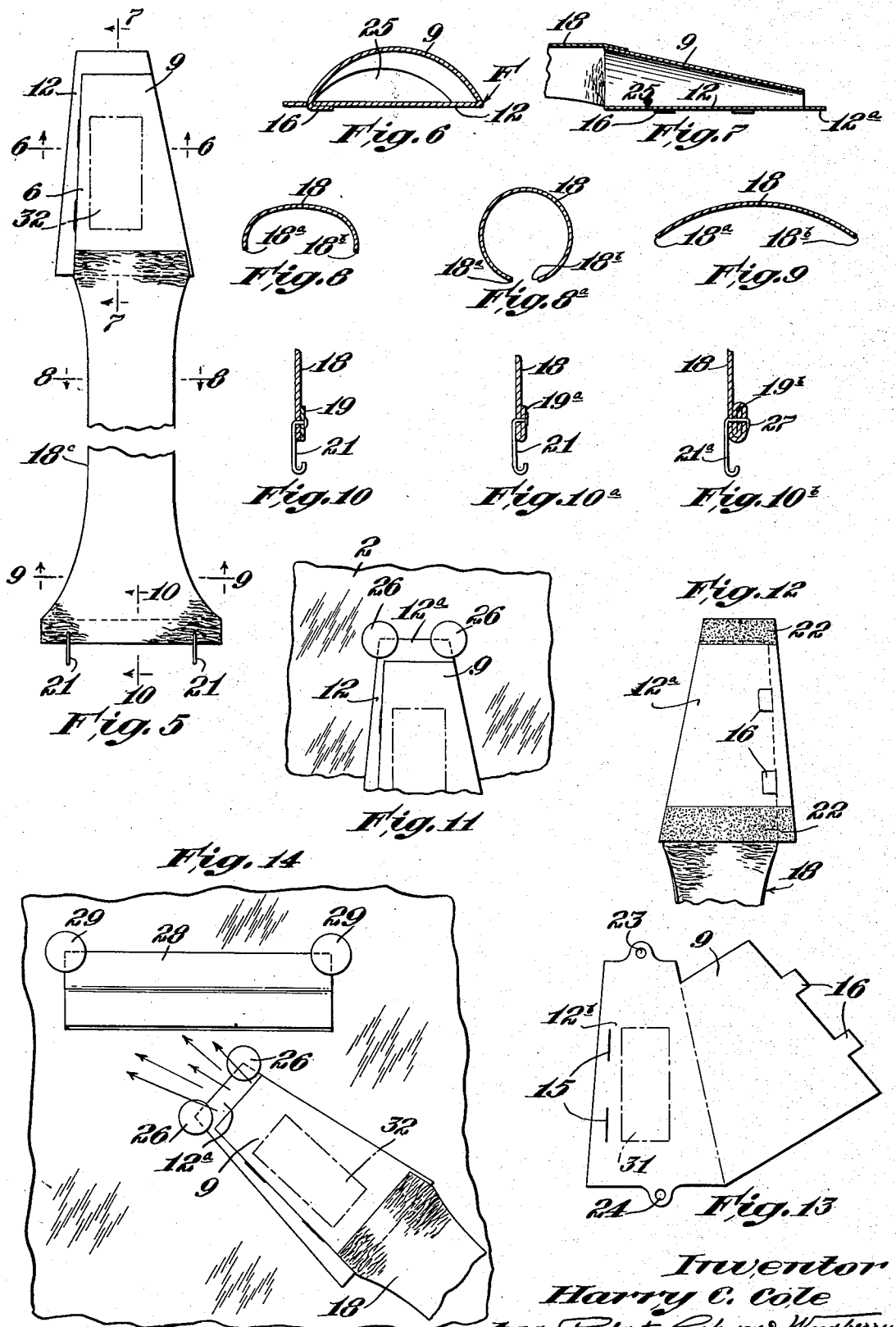
Inventor
Harry C. Cole
by Roberts Cushman & Woodberry
Attys.

Patented Dec. 15, 1936

2,064,055

UNITED STATES PATENT OFFICE 2,064,055

WINDSHIELD HEATER

Harry C. Cole, Natick, Mass.

Application February 5, 1936, Serial No. 62,468

9 Claims. (Cl. 20—40.5)

This invention pertains to windshield heaters for motor vehicles and the like, designed to prevent or remove accumulations of sleet, snow or frost such as would interfere with the clear vision of the operator of the vehicle.

I am aware that devices designed for this purpose have heretofore been proposed, and that certain of said devices are reasonably efficient for the purpose, but all such prior devices known to me are objectionable for one reason or another. Except in extreme northern climates, the necessity or desirability of such a device is limited to a very small part of the year,—possibly to one or two occurrences during a winter and then perhaps for only a few hours, but on the other hand the occasions for the use of such a device may arise without substantial warning so that if the driver of the car is unable quickly to avail himself of the advantages of a windshield heater, he may find driving extremely difficult and dangerous.

Most of the windshield heaters heretofore proposed are unsightly and occupy substantial space, but on the other hand, by reason of the difficulty of removing and replacing them, they are allowed to remain in position during long periods in which they are not called upon to function. Most of these prior devices are complicated and expensive and require the services of a skilled mechanic for installing them. Ordinarily they are not available to the car user except at stores dealing in automobile accessories so that the would-be user, caught unprepared and away from centers of population or late at night, is wholly unable to provide himself with such a device when the emergency arises. Moreover most of these devices are expensive, and car owners often put off the purchase and installation of such a device until they are forced to do so by emergency conditions.

Principal objects of the present invention are to provide a windshield heater device of a type such that it may be applied, even by the most unskilled, without the use of tools; to provide a device of this type which may be so installed as to direct warm air against any desired area of the internal surface of the windshield, thereby quickly to remove interior frost and to warm the windshield so as to prevent exterior accumulations of snow or sleet; to provide a device of this character which may be made so cheaply that it may be retailed at drug stores, ten cent stores, gasoline filling stations or the like and thus may be available to the user at substantially all hours and at all parts of the country, or which may even be given away, for example, by oil or gasoline dealers as an advertising medium; which may be packed in small compass for shipment and storage; which may be readily removed and either folded up for further use or wholly discarded as desired so as to avoid occupying desirable car spaces when not in use, and which may be made of material easily obtainable and by production methods.

It is at present customary to provide motor vehicles with heating means for heating the interior of the car in cold weather, a common form of heater being arranged to deliver a current of warm air rearwardly into the vehicle from a point beneath the instrument board,—the air delivery means usually being located at the right hand side of the car so as to avoid interference with the steering post and other adjuncts adjacent to the driver. The present invention is designed to take advantage of the warm current of air so delivered, and to divert a portion at least of this air current for delivery across a selected area of the windshield so as to provide a clear and unobstructed view for the driver. In designing the improved windshield heater, according to the present invention, advantage has been taken of the inherent tendency of material such as creped paper to curl transversely, particularly when subjected to any longitudinal pull or tension and make use of this tendency in forming (from a normally flat strip of material) a flexible conduit, more or less tubular, through which the air from the heater is conducted to the windshield. In accordance with the present invention it is thus unnecessary to employ a permanently tubular more or less rigid conduit which would be difficult to pack away in a small space and expensive to make, fit and install, and by thus avoiding the use of a preformed permanently shaped conduit, it is possible to make a satisfactory heater at a very low cost which, as above noted, may be sold at so low a price as to be available substantially everywhere, which may be installed readily and disconnected when not required and folded up for further use, or thrown away as preferred. However, as constructed, the device is of substantial durability and may be used over long periods or time after time without rapid deterioration.

In the accompanying drawings certain desirable embodiments of the invention have been disclosed by way of example and in the drawings:

Fig. 5 is a fragmentary rear elevation of the device, set up and ready for application, showing the conduit member as having been pulled longitudinally and tensioned so as to become more or less tubular in section;

Fig. 6 is a section on the line 6—6 of Fig. 5;

Fig. 7 is a fragmentary section on the line 7—7 of Fig. 5;

Figure 1:
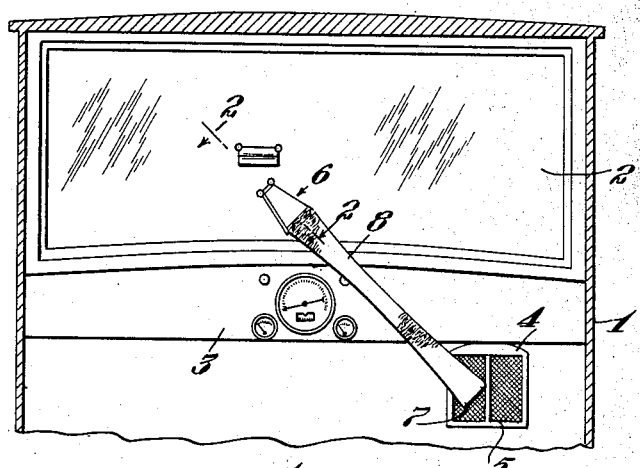
Fig. 1 is a fragmentary diagrammatic cross section through an automobile body, just to the rear of the windshield, illustrating the manner in which my improved windshield heater may be applied.

Figs. 8 and 8ª are sections substantially on the line 8—8 of Fig. 5 illustrating various degrees to which the conduit member may curl or approach the tubular when in use;

Fig. 9 is a section substantially on the line 9—9 of Fig. 5;

Fig. 10 is a section on the line 10—10 of Fig. 5;

Figs. 10ª and 10ᵇ are sections similar to Fig. 10 but illustrating modified constructions;

Fig. 11 is a fragmentary rear elevation showing the nozzle portion of the device applied to a windshield by the use of stickers;

Fig. 12 is a fragmentary elevation showing that surface of the front of the wall member of the device which is designed to contact with the windshield glass and illustrating one mode of securing it to the glass;

Fig. 13 is a plan view of a nozzle blank of modified form showing the forward wall member provided with special tabs for securing the nozzle to the windshield glass by means of suction cups; and Fig. 14 is a view generally similar to Fig. 11, but illustrating the use of a deflector hood above the delivery end of the nozzle.

Referring to the drawings, the numeral 1 designates a portion of the side wall of the forward part of an automobile body,—the windshield being indicated at 2 and the instrument board at 3. As illustrated, a car heater 4 is disposed below the instrument board 3 near the right hand side of the automobile body, such heater being, for example, of the circulating type connected to the water jacket of the motor and provided with a fan or other means whereby a current of heated air is delivered rearwardly into the automobile, for instance through a grid 5 of ornamental character.

The windshield heater device, in accordance with the present invention, comprises a nozzle member 6 designed to be applied directly to the glass of a windshield,—anchoring means 7 designed for attachment to some fixed part adjacent to the car heater, for example, directly to the grid 5, and a conduit member 8 extending from the nozzle to the anchoring means and whose lower end is disposed in the path of the current of heated air delivered from the heater.

The nozzle portion 6 of the windshield heater is preferably made from fairly stiff sheet material, for example, cardboard, although other materials may be employed. Preferably, though not necessarily, this nozzle member consists of a unitary piece of sheet material having substantially the shape indicated at the upper part of Fig. 4. Thus the sheet material is shaped to provide two portions 9 and 12, respectively, each of substantially truncated triangular contour,—the member 9 being designed to form the rear wall of the nozzle and the member 12 to form the front wall thereof. The member 9 has two convergent lateral edges 10 and 11 and the member 12 has two convergent edges 13 and 14, the edges 11 and 13 coinciding throughout the length of the part 9. However, the part 12 is preferably somewhat longer than the part 9 so that its narrower end 12ª projects beyond the narrower end 9ª of the part 9. The member 12 is also preferably narrower than the member 9 and is provided with slots 15 for the reception of the tabs 16 projecting from the free edge 10 of the member 9. While the parts 9 and 12 are thus preferably integral, being joined along their edges 11 and 13, it is contemplated that they may be made as wholly separate pieces and provided with slots and tabs or equivalent means adjacent to their opposite edges whereby they may be united when the nozzle is to be set up for use.

The conduit member comprises an elongate strip 18 of the appropriate selected material, such strip being long enough to extend from the desired location of the nozzle on the windshield to and partially across the delivery grid of the heater. Among the materials which have been tried it has been found that a fairly heavy creped Kraft paper is the most desirable. Creped sheet material has a strong inherent tendency to curl transversely when it is subjected to any tension in a direction perpendicular to the corrugations or lines of creping and it is this tendency to curl which has been taken advantage of in accordance with the present invention to provide a device which, while normally flat and readily capable of being folded, automatically assumes the form of a conduit or partial tube when installed in the position of use. Ordinary creped tissue paper may be employed but I prefer the stronger Kraft paper by reason of its greater inherent stiffness and durability. While creped paper is particularly desirable, other sheet materials which, when tensioned, exhibit such tendency to curl may be employed if desired. Thus I have noted that certain types of knitted textile fabric as well as bias cut woven fabrics exhibit this tendency to some degree, although such materials are not usually wholly impervious to the air current and are normally quite limp and not as satisfactory for the purpose as the stiffer and substantially impervious paper. Desirably, in order to enhance the appearance of the conduit member as well as to make it moisture proof and at the same time to conserve the heat of the air current which might otherwise be lost by radiation in traveling from the heater to the windshield, I may employ a creped paper having its outer face coated with metal, for example aluminum foil, although this is not necessary to the practice of the invention.

Having prepared a strip of the material of a width substantially equal to the width of the wider end of the member 9 of the nozzle and in such manner that the corrugations or creping lines extend transversely of the strip, I secure one end of this strip, as by means of adhesive or otherwise, to the wide end of the nozzle member 9. Preferably to the opposite end of the strip 18 I secure a stiffener or reinforcing member 10, Fig. 10, for example a strip of cardboard, or if desired thin, more or less ductile metal, and in this reinforced and stiffened end portion of the strip I provide one or more openings 20 for the reception of anchoring means, for example, small metallic hooks 21, cords or the like.

Figures 2, 3:
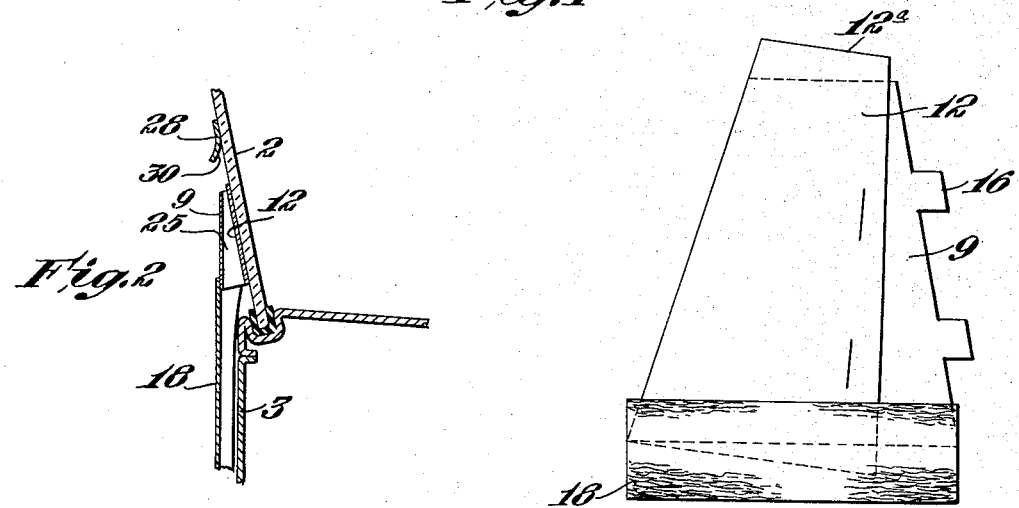
Fig. 2 is a fragmentary section substantially on the line 2—2 of Fig. 1.
Fig. 3 is a plan view of the device in collapsed condition ready for shipment or storage.

The device, thus completed, may be packed preparatory to shipment and sale by folding the members 9 and 12 flat together, as shown in Fig. 3, and by then folding or rolling the strip 18 so that it overlies the folded members 9 and 12. The device as thus arranged occupies little space and may be placed in an envelope or other simple form of container for delivery to the user together with such attaching and adjunctive elements as may be desired.

To facilitate attaching the nozzle to the windshield I may, if desired, provide certain areas (as shown at 22 in Fig. 13) of the front member 12 of the nozzle with adhesive of any desired type, for example one which becomes sticky when moistened, such as a gum composition, or preferably one of thermoplastic character which becomes temporarily adhesive when heated; for example a rubber or resinous compound. On the other hand, if desired, the nozzle blank may be of the shape indicated at 14, the member 12$^b$ being furnished with special tabs 23 and 24 at its opposite ends having openings or other suitable means for attaching them to suction cups (not shown) adapted to adhere to the windshield when pressed against the latter.

Figure 4:
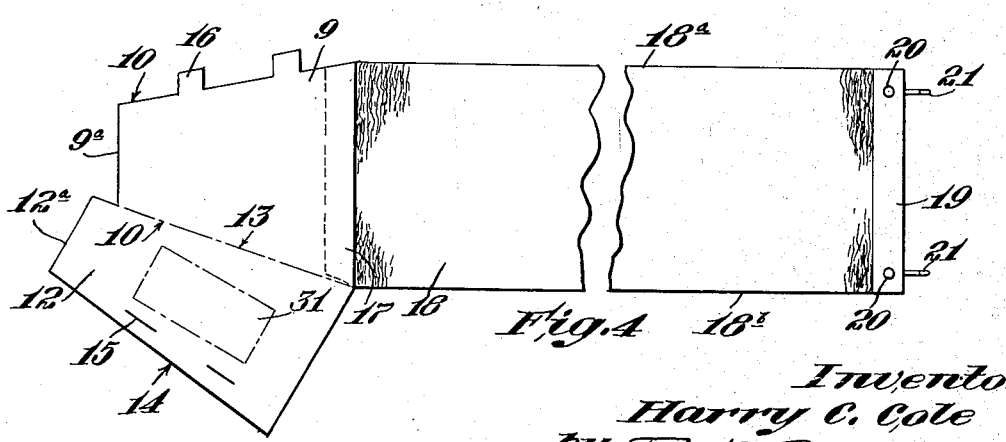
Fig. 4 is a fragmentary plan view showing the device unfolded and ready to be set up and applied.

When attaching a nozzle member such as illustrated in Figs. 3 and 4 which is not itself provided with adhesive, I may secure it in place as by means of adhesive wafers 27 (Fig. 11) of any desired type which are so applied as to overlap the end portion 12$^a$ of the wall member 12 of the nozzle and to secure the latter directly to the windshield glass.

Since the nozzle is attached directly to the windshield itself, and does not depend upon any special brackets or other fixtures, it may be disposed at any portion of the windshield and so as to direct the air current (which emerges from the smaller end of the nozzle) in any desired direction.

Before installing the device it is unfolded from the position shown in Fig. 3, and the nozzle is then set up by causing the member 9 to bow outwardly away from the member 12 and inserting the tab 16 in the slots 15 thereby to maintain the parts in this relative position, forming within the nozzle a passage 25 which converges from its receiving end (adjacent to the conduit member 18) toward its delivery end. Having set the nozzle up in this way and having secured it to the windshield glass at the desired position by any of the means described above, the conduit member 18 is then stretched out until its lower end overlaps or partly overlaps the grid 5 of the car heater 4. When the normally flat creped strip 18 is subjected to slight pull or tensioning its opposite edges 18$^a$ and 18$^b$ tend to curl toward each other, and since the upper end of the strip is secured to the now curved or bowed wall member 9 of the nozzle, the initial curl at this point predetermines the direction of curl of the remainder of the strip, so that it becomes concave in a forward direction. The degree of curl depends somewhat on the nature of the material selected and also on the length of the strip and the tensioning to which it is subjected. Thus the edges 18$^a$ and 18$^b$ may be substantially separated as indicated in Fig. 8, or very closely approached as indicated in Fig. 8$^a$ so as in effect to form a nearly complete tube, or they may overlap to form a complete tube.

However the lower end of the strip is stiffened by the member 19 so that this end is not able to curl so freely and ordinarily presents but a relatively shallow curvature or concavity toward the air current from the heater. By reason of the flexibility of the conduit member, it may be bent or curved to some extent so as to pass around obstructions intervening between the heater and nozzle. The current of air which impinges upon the forwardly concave lower end of the conduit member flows freely up along the concavity of the conduit and a large portion of this air enters the larger end of the nozzle member and is delivered in a stream of predetermined direction and enhanced velocity against the inner surface of the windshield so as to flow substantially parallel to the latter.

If desired, in order to avoid too rapid dissipation of the air current thus delivered and to cause it to travel laterally across the field of the driver's vision, it may be desirable to provide a hood or distribution member at a point above the delivery end of the nozzle, for example a thin strip 28 of cellophane or the like,—preferably substantially transparent, which may be secured by adhesive disks or wafers 29 to the face of the windshield with its lower edge free so that it tends to flare away from the windshield, leaving a space or channel 30 (Fig. 2) along which the air tends to flow.

The device thus provided is effective for its purpose,—very quickly removing frost from the interior of the windshield and so warming the entire thickness of the glass that ice and snow do not readily collect upon its outer surface.

As above described it is preferred to stiffen the lower end of the conduit member 18 to some extent and also to reinforce it for the reception of the anchoring means and while it is desirable to provide a stiffener strip 19 such as above described I may secure somewhat the same results merely by folding over the material of the strip 18 as indicated at 19$^a$ in Fig. 10$^a$ thus increasing the inherent stiffness at this point and also providing added thickness for the reception of the anchoring means.

On the other hand, in order that the device may be applicable to automobiles of varying styles and may be easily accommodated to different locations of the heater, it may be preferred to make the strip 18 of the maximum length which might ever be required and then to roll over its lower end when it is to be installed as indicated at 19$^b$ (Fig. 10$^b$) until the desired length of conduit member is obtained. It is then proposed to employ an anchorage device 21$^a$ having a sharp point 27 which may be thrust through the several thicknesses at 19$^b$ and bent over so as permanently to fix the several folds or thicknesses together.

The inner surface of the member 12 provides a convenient space 31 upon which may be written directions to the user for setting up and applying the device, while the outer surface of the member 9 furnishes a convenient space 32 for the application of advertising matter or decorative material if such be desired.

While I have illustrated certain useful embodiments of the invention I wish it to be understood that the invention is not limited to the precise materials herein described nor to the particular shapes and relative dimensions of the parts but is to be regarded as broadly inclusive of all equivalents such as fall within the scope of the appended claims.

I claim:

1. A windshield heater comprising a nozzle member, anchorage means, and a normally flat strip of sheet material possessing the inherent tendency to curl transversely when tensioned, connecting the nozzle member to the anchorage means.

2. The combination with the windshield of an automobile of defrosting means operative to direct a current of air across the inner surface of the windshield, said defrosting means comprising a normally flat strip of thin sheet material provided at one end with an air distributing element, means for securing said air distributing element in operative position relatively to the windshield, anchorage means operative to secure the other end of the strip so that it lies in the path of the stream of air delivered by the car heater, said strip being capable of bending transversely and being of such width that when bent transversely throughout its length it forms a longitudinal channel effective to conduct air from the car heater to the distributing element.

3. A windshield heater comprising a nozzle member of stiff sheet material comprising a front wall designed to engage the surface of the windshield glass and a transversely bowed rear wall, said walls being shaped to provide a convergent delivery passage, anchorage means designed for engagement with the delivery grill of a heater device, and an elongate strip of creped paper, having its creping extending transversely of the strip, connected at one end to the intake end of the nozzle and at the other end to said anchorage means.

4. In combination with the windshield of an automobile and a car heater designed to deliver a stream of warm air rearwardly into the automobile, a windshield heater comprising a nozzle member attached directly to the inner surface of the windshield glass, and a strip of creped paper extending from the nozzle to and at least partially across the stream of air delivered from the heater, said creped strip being transversely curled so as to be concave in a forward direction and thereby forming an upwardly directed conduit for conducting a portion of the warm air to the nozzle.

5. A windshield heater comprising a nozzle having a substantially flat wall designed to lie in contact with the inner surface of the windshield and an outwardly bowed wall whose lateral edges engage said front wall anchorage means designed to be fixed adjacent to a warm air delivery device, and a strip of creped sheet material, possessing the inherent tendency to curl transversely when longitudinally tensioned, one end of the strip being secured to the bowed wall of the nozzle and its other end being attached to the anchorage means.

6. In combination with the windshield of an automobile having a heater designed to deliver a stream of warm air rearwardly into the automobile, a strip of creped paper extending from the windshield to the heater, means for securing the upper end of the strip at a point adjacent to the windshield in such a way as to hold said upper end in a transversely curled or bowed shape with its concavity toward the plane of the windshield, and means for anchoring the other end of said strip so as to hold said strip under longitudinal tension whereby, by reason of the inherent tendency of the creped paper to curl transversely when tensioned, the concavity of its upper end extends substantially to its lower end thereby forming a conduit for warm air from the heater to the windshield.

7. A foldable windshield heater comprising a nozzle including normally flat front and rear wall members adapted, when not in use to overlie one another in face-to-face contact, one at least of said members being designed and arranged to be bowed transversely and to be so united to the other of said wall members as to define a nozzle passage for directing a current of air in a predetermined direction, means for uniting said front and rear wall members to form such a nozzle passage, an anchorage element designed to engage a fixed part adjacent to a warm air delivery grill, and a strip of creped material secured at one end to one of said wall members of the nozzle and at its opposite end to the anchorage element, said strip being capable of being folded so as to overlie the flat contacting nozzle members.

8. A foldable windshield heater comprising a nozzle having front and rear wall members of sheet material and each of truncated triangular contour, one of said wall members being longer and narrower than the other, means holding said wall members in assembled operative relation with the central portion of the wider member bowed away from the narrower member but with the lateral edges of the two members in contact, a strip of creped paper possessing an inherent tendency to curl transversely and to become concave at one side when tensioned, said strip being of substantially the same width as the wider end of the wider nozzle member, means securing one end of the strip to said wider end of the nozzle member, said strip of paper being of a length such as to extend from the windshield of an automobile to the vicinity of a heater installed in the automobile and having an outlet for warm air, and means for anchoring the other end of said strip in such a position that warm air delivered from the heater impinges upon the concave surface of the elongate paper strip.

9. A windshield heater comprising a folded nozzle consisting of a unitary piece of cardboard including front and rear wall members each of truncated triangular contour, one of said members being narrower and longer than the other, one longitudinal edge of each of said members being integrally joined to the other member, the opposite edges of said members being provided with tabs and slits, respectively, whereby, after bowing the central part of the wider member away from the other, their free edges may be united thereby to form a convergent nozzle having a substantially flat front wall, means for adhesively uniting said flat front wall directly to the surface of the windshield glass, a strip of creped paper having one end attached to the wider end of the bowed wall of the nozzle whereby said end of the strip is transversely curled and forwardly concave, the strip being long enough to extend from the windshield to a car heater having a delivery opening below the windshield, stiffening means for the other end of the strip, and anchoring means at the stiffened end of the strip for securing said end at a point adjacent to the heater and in such position that the lower end of the strip is disposed transversely of the stream of air delivered by the heater and so that the strip is tensioned, whereby the inherent tendency of the strip to curl transversely causes it to assume the form of a forwardly concave duct for directing air from the heater to the nozzle.

HARRY C. COLE.